Patented Nov. 12, 1935

2,020,647

UNITED STATES PATENT OFFICE 2,020,647

METHOD OF MANUFACTURING BACTERIAL SOLUTIONS

Roderick Francis Hunwicke, Barnet, England

No Drawing. Application May 28, 1934, Serial No. 728,045. In Great Britain June 7, 1933

7 Claims. (Cl. 167—78)

The present invention relates to improvements in or relating to a method of manufacturing bacterial solutions particularly but not exclusively for obtaining endotoxins from bacteria.

It is an object of the present invention to provide an improved method of dissolving bacteria whereby bacterial solutions are obtained in which the antigenic properties of the bacterial toxins are unimpaired.

According to the present invention I provide a method of manufacturing solutions of bacteria by dissolving the latter in an aqueous solution containing the sodium salt of lauryl alcohol sulphuric ester ($CH_3(CH_2)_{10}OCH_2O.SO_3Na$).

It is preferred to add sodium hydroxide to the solution as it has been found that the addition of sodium hydroxide greatly increases the solvent power of the solution for gram positive as well as gram negative organisms. Thus it was found that whilst gram negative bacteria such for example as B. Coli are readily dissolved by a solution of the sodium salt of lauryl alcohol sulphuric ester, gram positive bacteria such as staphylococci are only partially acted upon. Complete solution of both groups of bacteria in a bacterial suspension can be effected by adding to the suspension an equal volume of a mixture composed as follows:—One part of a 2% solution of a commercial preparation known as sulphonated Lorol containing 60% of the sodium salt of lauryl alcohol sulphuric ester, with one part of a 3.6% solution of sodium hydroxide. The pH of this solvent is about 13.4. The solvent is turbid in the cold but perfectly clear at 37°. It has been found that the addition of 0.5% phenol to the solvent or solution of bacteria to a great extent prevents the development of turbidity in the cold. The solvent should preferably be freshly made up each time it is required.

Solution of bacterial may be effected for example by washing off a twenty-four hours' old culture of the organism on an agar slope in a few cubic centimetres of sterile water. To the suspension so obtained, an equal volume of the solvent is added and the two are well mixed. In the case of gram negative bacteria solution is almost immediate, the mixture becoming completely clear to the eye if it is gently warmed. The solution of gram positive organisms requires several hours and it is therefore convenient to leave them in an incubator preferably at about 42° C. overnight. In some cases a period of 24 hours or even of some days is necessary for complete solution.

In order that the invention may be well understood the following example of the preparation of a dissolved vaccine will be given by way of illustration only.

A suspension of bacteria is prepared in the manner above described by washing off a culture on an agar slope and the suspension is standardized to a concentration that will give the equivalent of any desired concentration of bacteria per cubic centimetre after neutralization of the final solution. A quantity of this suspension is mixed with an equal quantity of a solvent prepared by mixing a 2% solution of the product known as sulphonated "Lorol" (containing about 60% of the sodium salt of lauryl alcohol sulphuric ester) with an equal quantity of 3.6% sodium hydroxide. The mixture of bacterial suspension and solvent is kept at 42° C. till solution is complete. The solution is now sterile and no sterilization by heat is required. The pH is then adjusted to 7.4 with hydrochloric acid using an appropriate indicator, the hydrochloric acid reacting with sodium hydroxide to form sodium chloride. The dissolved bacteria are now in saline solution and are suitable for injection. The concentration of sodium chloride can if desired be adjusted exactly to that of normal saline (0.9%) by adding a calculated quantity of salt.

If desired the neutralized solution may be sterilized in a manner similar to that employed in the sterilization of vaccines and then comprises a sterile solution of endotoxins in saline and has many applications in medical and immunological science.

Subcutaneous injection of the solvent prepared as above described whether neutralized or not, into animals has shown it to be nontoxic even in large doses. The vaccines produced have marked antigenic properties.

Whilst in the foregoing I have described a specific example of a method of carrying out my invention it is to be understood that the manipulative details may be varied or modified as desired or as necessary to suit various particular cases.

I claim:

1. A method of manufacturing bacterial solutions including the step of dissolving bacteria in an alkaline aqueous solution containing a small percentage of caustic soda and a small percentage of the sodium salt of lauryl alcohol sulphuric ester.

2. A method of manufacturing bacterial solutions including the steps of dissolving bacteria in a solvent comprising a small proportion of the sodium salt of lauryl alcohol sulphuric acid and caustic soda and then neutralizing the bacterial solution with hydrochloric acid.

3. A method of manufacturing bacterial solutions including the steps of dissolving bacteria in a solvent comprising an alkaline aqueous solution of the sodium salt of lauryl alcohol sulphuric ester, neutralizing the bacterial solution with hydrochloric acid and adjusting the sodium chloride concentration of the solution to that of normal saline.

4. A solution of bacteria in an aqueous medium containing the sodium salt of lauryl alcohol sulphuric ester and caustic soda.

5. A solution of bacteria in an aqueous medium containing a small percentage of the sodium salt of lauryl alcohol sulphuric ester and sodium chloride in the concentration of normal saline.

6. A method of manufacturing dissolved vaccines including the steps of preparing a suspension of bacteria, adding to said suspension an equal part of a solvent obtained by mixing one part of 1½–2% solution of the sodium salt of lauryl alcohol sulphuric ester with one part of a 3.6% solution of sodium hydroxide, maintaining the temperature of the mixture at 42° C. until solution is complete, neutralizing the solution with hydrochloric acid and adjusting the sodium chloride content to that of normal saline.

7. A method of manufacturing bacterial solutions including the step of dissolving bacteria in an aqueous solution containing the sodium salt of lauryl alcohol sulphuric ester.

RODERICK FRANCIS HUNWICKE.